United States Patent Office 2,965,838
Patented Dec. 20, 1960

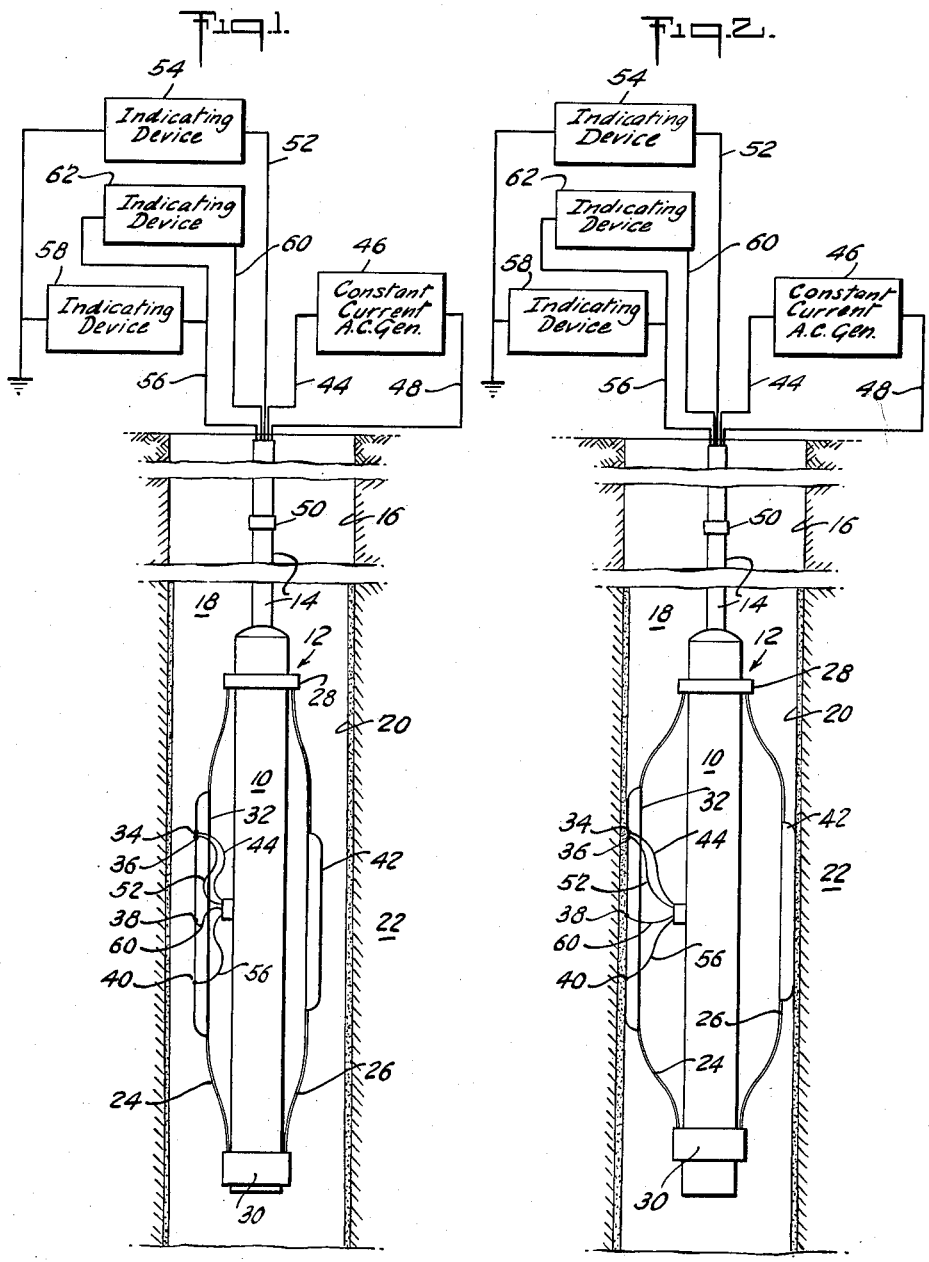

2,965,838

ELECTRICAL LOGGING SYSTEM FOR EXPLORING SUBSURFACE FORMATIONS

Thomas L. Kister, Bellaire, Tex., assignor to Texaco Inc., a corporation of Delaware Filed Apr. 3, 1957, Ser. No. 650,388

6 Claims. (Cl. 324—1)

This invention relates to an electrical logging system for exploring subsurface formations traversed by a borehole and more particularly to an electrical logging system utilizing closely spaced electrodes embedded in a pad or cushion which is adapted to be pressed against the wall of a borehole.

In well dri'ling operations it is customary to use drilling muds comprising finely divided particles suspended in a liquid, for example, water. The hydrostatic pressure at any given point in the column of mud in the well is normally greater than the pressure at an adjacent point in the subsurface formations traversed by the borehole. Therefore, the mud flows into the subsurface formations when the formations are permeable. The permeable subsurface formations screen out the particles in the mud permitting only the mud filtrate to invade the formation to form an invaded zone therein and a layer or cake of mud on the wall of the borehole. The mud cake may at times have a thickness of one inch or even more and the mud filtrate may invade a permeable formation to a distance of one foot or even more.

It is known that a knowledge of the voltage distribution produced in the subsurface formations when current is passed therethrough can lead to quantitative determinations of hydrocarbon saturations, for example oil, in porous formations. A great variety of attempts have been made in past years to measure in situ the voltage distribution in or resistivity of earth formations penetrated by boreholes. Prior art electrical logging systems which have been used for deriving the porosity of formations, and for providing detailed correlation, are systems which utilize a pad designed to ride over and in contact with the mud cake, such as the systems illustrated and described in U.S. Patents Nos. 2,669,688 and 2,712,629. These prior art contact pad systems attempt to measure the resistivity of the invaded zone of a permeable formation. The invaded zone resistivity is used to determine the formation resistivity factor, which factor is then used to calculate porosity. Embedded in the contact pad of these systems is a plurality of closely spaced electrodes disposed therein to produce highly localized measurements near the wall of the borehole. Since the mud cake over which the contact pad rides may have a much lower resistivity than that of the invaded zone which lies immediately behind the mud cake, resistivity measurements of the invaded zone obtained by the use of contact pad systems are then considerably affected by the presence of the mud cake disposed between the pad and the invaded zone. Prior art contact type systems have been unable to correctly determine the resistivity of the invaded zone, nor have suitable means been provided for supplying information necessary to compensate accurately of the effect of the mud cake resistivity on the invaded zone resistivity contact type log. Many attempts have been made to correct for this important variable which is complicated by the fact that the mud cake resistivity varies within the borehole due to the varying pressure differential across the mud cake. One method commonly used to correct for the presence of the mud cake employs curves derived from statistical studies of muds and their mud cakes. These studies have shown that since muds vary widely in their chemical make-up the resistivity of a given mud cake will disagree considerably from the curves. Another prior art method measures the mud cake resistance of mud cake formed on filter paper by a filter press. Although the latter method was believed to be somewhat superior to the statistical method, it has not been found satisfactory and therefore it has not been extensively used.

In accordance with the present invention an electrical logging system is provided for logging a permeable formation which comprises first resistivity measuring means having a very small radius of investigation for measuring in situ the resistivity of only the mud cake formed on the formation and second resistivity measuring means having a radius of investigation many times that of said first resistivity measuring means to extend a substantial distance into the invaded zone of the permeable formation. The first resistivity measuring means may also be used selectively for accurately measuring in situ the mud resistivity whenever a log of the mud resistivity is desired.

In order that the invention may be more clearly understood and readily carried into effect it will now be described more fully with reference to the accompanying drawing in which:

Fig. 1 is a schematic diagram, partly in longitudinal section, showing in a borehole the well logging system in its collapsed condition which may be used for logging the mud therein in accordance with the invention; and Fig. 2 is a schematic diagram, partly in longitudinal section, showing the well logging system in position in a borehole for logging the mud cake formed on and the invaded zone of a permeable formation.

Referring to the drawing there is shown in Figs. 1 and 2 a tubular support 10 of a tool 12 suspended on an insulated cable 14 in a borehole 16 filled with a drilling fluid or mud 18 in which a mud cake 20 has formed on the wall of a permeable subsurface formation 22. Two bow springs 24 and 26 are each pivotally secured to an upper collar 28 and a lower collar 30, which collars are slidably mounted on tubular support 10. If desired, one of these two collars 28 and 30 may be rigidly secured to the tubular support 10, or stop means may be disposed on the tubular support 10 between the two collars 28 and 30 to limit the movement of the collars 28 and 30 along the longitudinal axis of the tubular support 10. A pad 32 is carried by bow spring 24. The pad 32 may be made of hard rubber or of steel with an insulating rubber cover and a front surface or face designed so that it is straight longitudinally and substantially round in the radial direction. In the face of the pad 32 are embedded and maintained in fixed spaced relationship to each other a current electrode 34, a first potential electrode 36 spaced about $\frac{1}{16}$ to $\frac{1}{8}$ of an inch from current electrode 34, a second potential electrode 38 which may be spaced approximately 1 inch from current electrode 34 and a third potential electrode 40 which may be spaced approximately 2 inches from current electrode 34 and about 1 inch from potential electrode 38. At least a portion of each of the electrodes 34, 36, 38 and 40 may be exposed in small recesses located in the straight portion of the face of the pad 32. An auxiliary pad 42 may be carried by bow spring 26 to facilitate movement of the tool 12 through the borehole 16.

An insulated conductor 44 of cable 14 is connected between the current electrode 34 and a terminal of a constant current source, for example, alternating current generator 46, or if desired, a suitable direct current generator, and a second insulated conductor 48 of cable 14 is connected between the other terminal of the alternating current generator 46 and a grounded electrode 50 disposed on cable 14 an appreciable distance from current electrode 34. A third insulated conductor 52 of cable 14 is connected between the first potential electrode 36 and a terminal of a first indicating device 54, the other terminal of the indicating device 54 being grounded at the surface of the earth. A fourth insulated conductor 56 of cable 14 is connected between the third potential electrode 40 and one terminal of a second indicating device 58, the other terminal of the second indicating device 58 being grounded at the surface of the earth. A fifth insulated conductor 60 of cable 14 is connected to the second potential electrode 38. A third indicating device 62 is connected between conductors 56 and 60 to second and third potential electrodes 38 and 40 respectively.

In operation the tool 12 is lowered into the borehole 16 with the two collars 28 and 30 maintained in fixed or locked positions at a given distance from each other to collapse the pads 32 and 42 from the wall of the borehole 16 as shown in Fig. 1. When the tool 12 is being lowered into the borehole 16 indicating device 54 may be made operative to provide a resistivity log of the mud in the bore hole. Since the potential electrode 36 to which the indicating device 54 is connected via conductor 52 is spaced from current electrode 34 by approximately $\frac{1}{16}$ to $\frac{1}{8}$ of an inch it will readily be seen that the log produced by indicating device 54 will be influenced little if any by the subsurface formations or the mud cakes formed thereon and therefore will provide the true resistivity of the mud throughout the entire depth of the bore hole 16. It can readily be seen that the method of this invention is far superior to the prior art method often used wherein the mud resistivity is obtained at the well site by measuring a sample of the mud at the surface and then making corrections for temperature effects since the mud resistivity is not a linear function of any one variable, such as temperature, depth or pressure.

When the tool 12 has reached the bottom of the borehole or the lowest formation traversed by the borehole which is to be logged, at least one of the two collars 28 and 30 is released to move substantially freely along the longitudinal axis of the tubular support 10 to thus permit bow springs 24 and 26 to urge pads 32 and 42 against the mud cake or wall of the borehole as shown in Fig. 2 of the drawing. The means for releasing at least one of the collars 28 and 30 may be any one of the known releasing devices commonly used in well logging, for example, the releasing device illustrated and described in the above-mentioned U.S. Patent No. 2,669,688. To obtain the resistivity log of the mud cake and the invaded zone of the subsurface formations traversed by the borehole 16 the tool 12 is moved preferably upwardly in the borehole with the face of the pad 32 riding over the mud cake or wall of the borehole due to the force thereon produced by bow springs 24 and 26 urging the pads in an outward direction. With the electrodes 34, 36, 38 and 40 substantially in direct contact with the mud cake of a permeable formation, for example mud cake 20 formed on permeable formation 22, the indicating device 54 will now provide indications of the resistivity of the mud cake 20 instead of the resistivity of the mud 18 contained in the borehole since the pad 32 insulates the electrodes 34, 36, 38 and 40 from the mud 18. Furthermore, due to the short spacing between the current electrode 34 and the potential electrode 36 which is connected to indicating device 54 the resistivity of the invaded zone of the permeable formation 22 will not affect the mud cake resistivity indications provided by indicating device 54 and therefore this device 54 will provide a first log which will indicate the true resistivity of the mud cake.

The system of the invention, in addition to providing the log of the mud cake resistivity, also provides simultaneously a second log produced by means, including indicating device 58 connected to electrode 40, which has a radius of investigation penetrating a substantial distance into the invaded zone via the mud cake. It can readily be seen that even though the second resistivity log has been affected by the resistivity of the mud cake, appropriate corrections can be made to the second log to provide true resistivity values of the invaded zone since accurate values of the mud cake have been recorded by indicating device 54.

If desired a third log may be obtained simultaneously with the first and second logs by utilizing indicating device 62 and potential electrode 38. The means for obtaining the third log preferably has a radius of investigation which is intermediate that of the means used to obtain the first and second logs. The second and third logs are often used to identify the presence of a permeable formation by locating separations between these two logs since at a permeable formation the log obtained by means having the smaller radius of investigation will be affected more by the resistivity of the mud cake which forms on permeable formations than will the log obtained by means having the larger radius of investigation.

Obviously, many modifications and variations of the invention as hereinabove set forth may be made without departing from the spirit and scope thereof and therefore only such limitations should be imposed as are indicated in the appended claims.

I claim:

1. A system for logging a borehole containing a relatively conductive mud wherein a mud cake of a given thickness has formed on a permeable formation, said system comprising first electrical resistivity measuring means having a radius of investigation substantially less than the thickness of the mud cake for measuring the resistivity of said mud cake, second electrical resistivity measuring means having a radius of investigation several times greater than the thickness of the mud cake, and means for insulating said electrical resistivity measuring means from said conductive mud.

2. A method for obtaining indications of electrical resistivity in a borehole containing a column of relatively conductive mud and traversing a permeable formation on which a given mud cake has formed comprising the steps of establishing a current flow in the column of mud, mud cake and permeable formation, detecting the potential difference in the mud cake between two points spaced apart a distance equal to a small fraction of the thickness of the given mud cake, and detecting the potential difference between two points substantially in the permeable formation and spaced apart a distance equal to at least twice the thickness of the mud cake, while electrically insulating said points from said mud column.

3. A method for obtaining an indication of electrical resistivity in a borehole containing a column of relatively conductive mud and traversing a permeable formation on which a given mud cake has formed comprising the steps of introducing a substantially constant current into said borehole, continually detecting progressively in one direction through the borehole potential variations throughout the length of the column of mud between two points spaced apart a distance much less than the thickness of said given mud cake, and continually and simultaneously detecting progressively in the direction opposite said one direction the variation in potential in the mud cake between two points spaced apart said same distance and the potential variation between two points substantially in the permeable formation said last named two points being spaced apart a distance equal to not less than about two inches while electrically insulating said points from said mud column.

4. A system for logging a bore hole containing a relatively conductive mud wherein a relatively conductive mud cake of a given thickness has formed in a permeable formation, said system comprising means including a first electrode adapted to be substantially in contact with the wall of the bore hole for supplying current thereto, first electrical resistivity measuring means including a second electrode spaced substantially less than said given mud cake thickness from said first electrode, said second electrode being electrically connected to the wall of the bore hole but insulated from the conductive mud, and second electrical resistivity measuring means having a third electrode spaced a distance several times greater than said given mud cake thickness from said first electrode, said third electrode being substantially in contact with the wall of the bore hole but insulated from the conductive mud.

5. A system for logging a bore hole containing a relatively conductive mud wherein a conductive mud cake having a given thickness has formed on a permeable formation, said system comprising means including a first electrode adapted to be disposed substantially in contact with the mud cake for supplying current therethrough into the permeable formation, first electrical resistivity measuring means including a second electrode spaced a distance substantially less than said given thickness from said first electrode and adapted to be disposed substantially in contact with the mud cake, second electrical resistivity measuring means including a third electrode disposed at least two inches from said first electrode and adapted to be disposed substantially in contact with said mud cake, and third electrical resistivity measuring means including a fourth electrode disposed at a point intermediate said second and third electrodes and adapted to be substantially in contact with said mud cake, each of said electrodes being insulated from said conductive mud.

6. Well logging apparatus having a collapsed condition and an extended condition for logging a well containing a relatively conductive mud wherein a mud cake having a given thickness has formed on a permeable formation traversed by the well comprising a support member adapted to be moved through said well, an insulating pad including a plurality of spaced electrodes mounted on said support member, means including a first one of said electrodes for passing a substantially constant current into said well, said means including a second one of said electrodes spaced from said first electrode by a distance substantially less than said given mud cake thickness for indicating variations in potential between said first and second electrodes, means including a third one of said electrodes spaced a distance several times greater than said given mud cake thickness from said first electrode for indicating variations in potential between said first and third electrodes, and means for selectively positioning said pad at a point away from or at a point near to said support member to place said apparatus in the extended or collapsed condition respectively, whereby said first means measures the mud cake resistivity when the apparatus is in the extended condition and the mud resistivity when the apparatus is in the collapsed condition.

References Cited in the file of this patent

UNITED STATES PATENTS

| | | |
|---|---|---|
| 2,415,364 | Mounce | Feb. 4, 1947 |
| 2,654,064 | Broding | Sept. 29, 1953 |
| 2,655,632 | Murphree | Oct. 13, 1953 |
| 2,669,688 | Doll | Feb. 16, 1954 |
| 2,754,475 | Norelius | July 10, 1956 |
| 2,782,364 | Shuler | Feb. 19, 1957 |
| 2,786,178 | Doll | Mar. 19, 1957 |